United States Patent [19]
Yokoyama

[11] Patent Number: 5,838,556
[45] Date of Patent: Nov. 17, 1998

[54] SWITCHING POWER SUPPLY CIRCUIT

[75] Inventor: Kenji Yokoyama, Hamamatsu, Japan

[73] Assignee: Yamaha Corporation, Hamamatsu, Japan

[21] Appl. No.: 712,190

[22] Filed: Sep. 11, 1996

[30] Foreign Application Priority Data

Sep. 18, 1995 [JP] Japan .................................. 7-263593

[51] Int. Cl.$^6$ .......................... H02H 7/122; H02M 3/335
[52] U.S. Cl. .............................................. 363/56; 363/19
[58] Field of Search ................................. 363/19, 56, 79

[56] References Cited

U.S. PATENT DOCUMENTS

| | | | |
|---|---|---|---|
| 4,754,386 | 6/1988 | De Weerd | 363/56 |
| 4,956,761 | 9/1990 | Higashi | 363/19 |
| 5,424,933 | 6/1995 | Illingworth | 363/56 |
| 5,465,201 | 11/1995 | Cohen | 363/56 |
| 5,528,483 | 6/1996 | Mohandes | 363/56 |

*Primary Examiner*—Stuart N. Hecker
*Attorney, Agent, or Firm*—Loeb & Loeb LLP

[57] ABSTRACT

A switching power supply circuit capable of accuraely performing a switching starting operation at a large load while reducing power consumption during an overload state is a back-boost type switching power supply circuit and includes a first transistor provided on a primary side and a second transistor which controls the first transistor, a first rectified output generation circuit for rectifying and outputting a forward mode output from a first auxiliary winding, a second rectified output generation circuit for rectifying and outputting a back-boost mode output from a second auxiliary winding, a threshold value circuit for judging presence of an overload state when the output of the second rectified output generation circuit is below a predetermined threshold value, a third transistor for oscillation control which brings the first transistor into an intermittent oscillation state when the overload state has been judged, and a differentiating circuit for detecting a starting time by differentiating the output of the first rectified output generation circuit and interrupting the switching control stop output.

1 Claim, 3 Drawing Sheets

5,838,556

SWITCHING POWER SUPPLY CIRCUIT

BACKGROUND OF THE INVENTION

This invention relates to a switching power supply circuit and, more particularly, to a switching power supply circuit having an improved overload protection circuit.

FIG. 4 shows an example of a prior art back-boost type switching power supply circuit having an arrangement for protection against overload. In this switching power supply circuit, a transistor Q1 which is a main switching element connected to a primary winding of a transformer is on-off controlled with a predetermined frequency and a dc output is provided from a rectifying smoothing circuit provided on the secondary winding side of the transformer. For stabilizing the secondary side output, a current detecting resistance R4 is connected to the emitter of the transistor Q1 and a Zenor diode ZD1 for detecting overload is provided on the secondary side. Further, a transistor Q2 is provided for controlling on-off time of the transistor Q1 in accordance with result of detection of overvoltage or overload.

Upon detection of overvoltage by the Zenor diode ZD1 on the secondary side, the transistor Q2 is turned on by the output of a photo-coupler PC and the main transistor Q1 is thereby turned off. Therefore, a constant voltage characteristic is obtained by a PWM control. When an overload current has exceeded a certain level with the result that terminal voltage of the resistance R4 has exceeded base-emitter voltage VBE of the transistor Q2, the transistor Q2 is turned on and the main transistor Q1 is thereby turned off. In other word, protection against overload in the switching power supply circuit is achieved by detection of overcurrent and the current is stabilized at the maximum current flowing through the transistor Q1. Therefore, the output characteristic of this circuit becomes one shown by a solid line in FIG. 5.

From the standpoint of reducing current consumption during short-circuiting due to overload in the switching power source, it is desirable that the load voltage-load current characteristic should be one shown by a dotted line in FIG. 5, namely one in which the load current decreases instead of increasing as shown by the solid line. In the case of the characteristic shown by the dotted line, a short-circuiting current point becomes B instead of a short-circuiting current point A provided in the case of the characteristic shown by the solid line. If, however, the short-circuiting current point is set at a small value as shown by the point B, starting of the power source becomes difficult. This is because, when the load is capacitive, an instantaneous short-circuited state is brought about at the time of turning on of the power source and, therefore, the load is judged to be in an overload state due to rush current applied to the load at the starting time, if the short-circuiting current point is so small as the point B in FIG. 5.

It is, therefore, an object of the invention to provide a switching power supply circuit capable of accurately starting the switching operation at a large load while reducing power consumption in an overload state.

SUMMARY OF THE INVENTION

For achieving the above described object of the invention, a switching power supply circuit comprises a dc voltage source, a transformer having a primary winding and a secondary winding and is connected in the primary winding to the dc voltage source, switching means provided between the dc voltage source and the transformer, a secondary side circuit provided on the secondary winding side of the transformer and comprising a rectifying smoothing circuit, switching control means for controlling turning on and off of the switching means by detecting output voltage and current of the secondary side circuit, first rectified output generation means for rectifying and outputting a forward mode output comprising a first auxiliary winding wound on the transformer and a rectifying circuit, second rectified output generation means for rectifying and outputting a back-boost mode output comprising a second auxiliary winding wound on the transformer and a rectifying circuit, a threshold value circuit which judges presence of an overload state when an output of the second rectified output generation circuit is below a predetermined threshold value, oscillation control means for supplying a control stop output to the switching control means when presence of an overload state has been judged by the threshold value circuit thereby to set the switching means to an intermittent oscillation mode, and a differentiating circuit for differentiating the output of the first rectified output generation means to detect a starting time and thereby interrupt the control stop output of the oscillation control means.

According to the invention, when presence of an overload state has been judged by using a forward mode rectified output and a back-boost mode rectified output, a control stop output is intermittently supplied to the switching control means to set the switching power source to an intermittent oscillation mode and, accordingly, reduction of power consumption is realized. Aside from the judgement of presence of an overload state, judgement of a power source starting time is made by differentiating the forward mode rectified output and, by interrupting the control stop output upon this judgement, starting of the power source at a large load is achieved.

A preferred embodiment of the invention will be described below with reference to the accompanying drawings.

BRIEF DESCRIPTION OF THE DRAWINGS

In the accompanying drawings.

DESCRIPTION OF A PREFERRED EMBODIMENT

Figure 1:
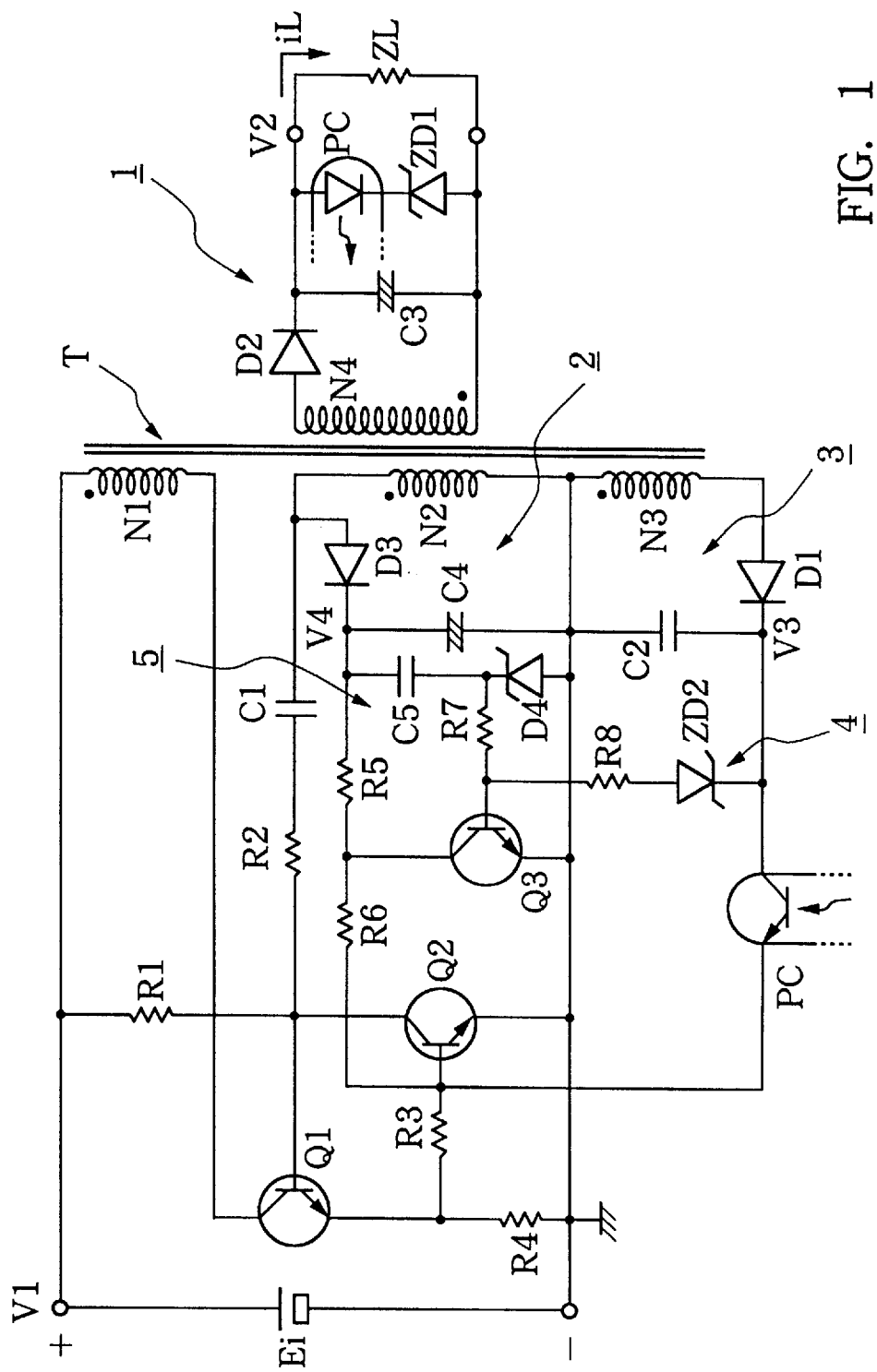
FIG. 1 is a circuit diagram showing an embodiment of the switching power supply circuit according to the invention.

FIG. 1 shows an embodiment of the switching power supply circuit made according to the invention.

A primary winding N1 of a transformer T is connected at one end thereof to a positive terminal of a dc voltage source Ei and, at the other end thereof, to a negative terminal of the dc voltage source Ei through a first transistor Q1 of an NPN type and a current detecting resistance R4. A starting resistance R1 is provided between the positive terminal of the power source Ei and the base of the transistor Q1. A first auxiliary winding N2 wound on the transformer T is a drive source for controlling turning on and off of the first transistor Q1 with a predetermined frequency. The first auxiliary winding N2 is connected at one end thereof to the base of the first transistor Q1 through a capacitor C1 and a resistance R2.

A second transistor Q2 of an NPN type constitutes switching control means for PWM controlling the first transistor Q1 in accordance with the output state. The second transistor Q2 is connected at its collector to the base of the transistor Q1, at its emitter to the negative terminal of the power source Ei and at its base to the emitter of the transistor Q1 through a resistance R3.

A secondary side circuit 1 includes a secondary winding N4 of the transformer T, a diode D2 and a capacitor C3 and rectifies and smoothes an output of a back-boost mode energy to a dc output. The secondary side circuit 1 further includes a series circuit of a Zenor diode ZD1 and a light-emitting element of a photo-coupler PC. A light-receiving transistor of the photo-coupler PC is inserted between the output of a second rectified output generation circuit 3 to be described later and the base of the second transistor Q2 so as to drive the transistor Q2 for a constant voltage control.

In addition to the first auxiliary winding N2, a second auxiliary winding N3 is wound on the transformer T. A first rectified output generation circuit 2 is comprised of the first auxiliary winding N2 and a half-wave rectifying circuit including a diode D3 and a capacitor C4 for rectifying and outputting a forward mode energy output from the first auxiliary winding N2. A second rectified output generation circuit 3 is comprised of the second auxiliary winding N3 and a half-wave rectifying circuit including a diode D1 and a capacitor C2 for rectifying and outputting a back-boost energy output from the second auxiliary winding N3.

On the primary side of the transformer T is further provided a third transistor Q3 of an NPN type for detecting a starting time and an overload state on the basis of the outputs of the rectified output generation circuits 2 and 3 and thereupon controlling the second transistor Q2 for an oscillation control. This third transistor Q3 for oscillation control is connected at its collector to the base of the second transistor Q2 through a resistance R6 and also to the output terminal of the first rectified output generation circuit 2 through a resistance R5, and at its emitter to the negative terminal of the dc voltage source Ei.

A Zenor diode ZD2 and a resistance R8 are connected between the output terminal of the second rectified output generation circuit 3 and the base of the third transistor Q3. The Zenor diode ZD2 constitutes a threshold value circuit 4 which detects that an output voltage V3 of the third rectified output generation circuit 3 is below a predetermined threshold value and thereby judges presence of an overload state. Since the output voltage V3 is a rectified output of a backward mode, this output voltage V3 is a value which is proportional to a secondary side output voltage V2 and an overload state can be detected by watching the output voltage V3. As will be described more fully later, when an overload state has been detected, the third transistor Q3 is intermittently turned off and a switching control stop output is thereby applied to the base of the second transistor Q2.

A differentiating circuit 5 consisting of a capacitor C5 and a resistance R7 is connected between the output terminal of the first rectified output generation circuit 2 and the base of the third transistor Q3. A diode D4 is inserted between the junction of the capacitor C5 and the resistance R7 and the negative terminal of the dc voltage source Ei. This differentiating circuit 5 detects starting time of the power source by detecting rising of the output of the first rectified output generation circuit 2. Regardless of the state of the load, the differentiating circuit 5 causes the third transistor Q3 to be turned on at the starting time and interrupts the switching control stop output to the base of the second transistor Q2.

The operation of the switching power supply circuit having the above described construction will now be described. Since an output voltage V4 of the first rectified output generation circuit 2 is a forward rectified output, a value which is determined by the ratio of windings between the winding N1 and the winding N2 is provided during both a normal operation state and an overload state so long as the first transistor Q1 is performing the switching operation. The output voltage V4 is so set that, when the transistor Q3 is off, the second transistor Q2 is sufficiently driven in an on state with a value obtained by dividing the output voltage V4 by combined resistances R5+R6 and resistance R3.

Since the output voltage V3 of the second rectified output generation circuit 3 is a backward rectified output, it is a value proportional to the secondary side output voltage V2. If, for example, the number of winding of the winding N3 is equal to that of the winding N4, V3 becomes equal to V2 and, therefore, when v2 drops due to an overload state, V3 also drops.

The Zenor diode ZD2 which constitutes the threshold value circuit 4 is maintained in the on state by the output voltage V3 of a steady state and is turned off when V3 drops by about −1 V.

Upon turning on of the power source, a base current is supplied to the third transistor Q3 through the differentiating circuit 5 by the output voltage V4 of the first rectified output generation circuit 2 whereby the third transistor Q3 is instantly turned on and the node of the resistances R5 and R6 is grounded. The starting current which flows at this time is determined by the resistance R4 and resistance (R3+R6). This starting current is set at a maximum load current.

Upon appearance of the output voltage V3 of the second rectified output generation circuit 3 which is proportional to the secondary side output voltage V2 by starting of the power source, the Zenor diode ZD2 is turned on and the base current of the third transistor Q3 is supplied through the resistance R8. More specifically, the base current which is supplied to the transistor Q3 through the instantaneous differentiating circuit 5 at the starting time is reduced to zero when charging of the capacitor C5 has been completed but the base current is continuously supplied through the resistance R8 on the basis of the output voltage V3 of the second rectified output generation circuit 3 whereby the transistor Q3 is maintained in the on state. This is the steady state, i.e., the state where the control stop output to the second transistor Q2 is interrupted.

In this steady state, in the same manner as in the prior art switching power supply circuit, the first transistor Q1 is on-off controlled with a predetermined frequency and a constant secondary output voltage V2 of a back-boost mode is obtained. When an overvoltage appears, the Zenor diode ZD1 of the secondary side circuit 1 is turned on and the photo-coupler PC thereby is turned on. This enables the PWM control in which the second transistor Q2 of the primary side is turned on and the first transistor Q1 is turned off and a constant voltage output thereby is produced.

Overcurrent is detected by the primary side current detecting resistance R4 and the output voltage V2 starts to drop in the same manner as in the prior art circuit depending upon setting of resistances R4, R3 and R6. When the output voltage V2 has dropped and the output voltage V3 of the second rectified output generation circuit 3 has dropped below the Zenor voltage of the Zenor diode ZD2, i.e., by about 1 V, the Zenor diode ZD2 is turned off and the base current of the third transistor Q3 is thereby interrupted. This is detection of an overload state by the threshold value circuit 4.

When the transistor Q3 is turned off by this detection of an overload state, its collector output functions as the switching control stop output to the base of the second transistor Q2. More specifically, the base current which is determined by the output voltage of the first rectified output generation circuit 2 and the resistances R5+R6 and R3 is supplied to the transistor Q2 to turn it on. As a result, the base and emitter of the transistor Q1 is short-circuited and oscillation thereby is stopped.

Figure 2:
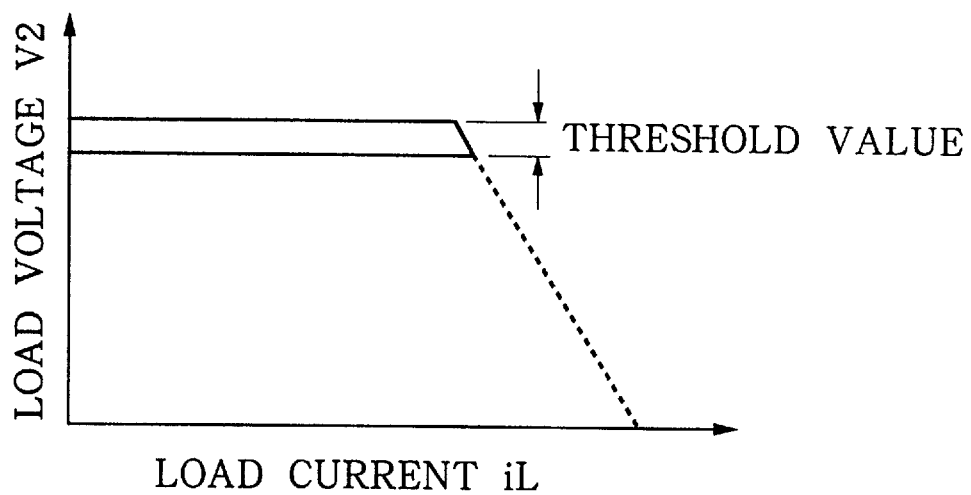
FIG. 2 is a diagram showing a load voltage-load current characteristic of this embodiment.

Accordingly, the load voltage-load current characteristic of this switching power supply circuit becomes one as shown in FIG. 2. An effective value of the pulse width shown in FIG. 2 becomes a short-circuited current value. The oscillation stop state continues until charges of the output capacitor C4 of the first rectified output generation circuit 2 and the capacitor C5 of the differentiating circuit 5 are discharged through the resistances R5 and R6 and through the resistances R3 and R4 and the base of the transistor Q2 whereby the on state of the transistor Q2 cannot be maintained any longer. When the transistor Q2 has been turned off, the same condition as the starting time prevails and the transistor Q3 is turned on again by the output of the differentiating circuit 5. In an overload state, the above described operation is repeated and an intermittent oscillation is thereby performed.

Figure 3:
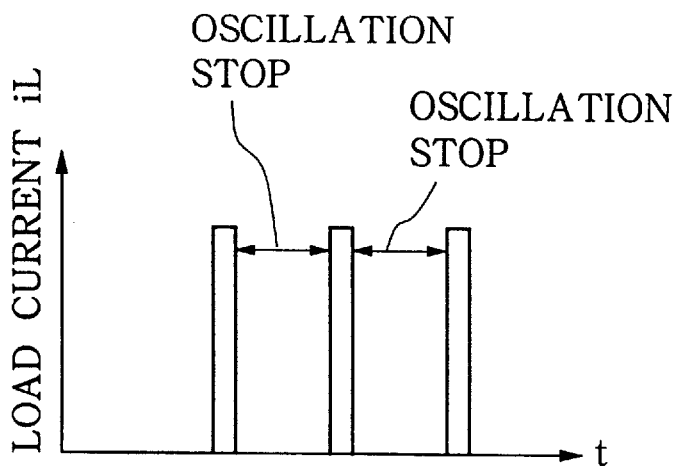
FIG. 3 is a diagram showing a load current characteristic of the embodiment in an intermittent oscillation state.
Figure 4:
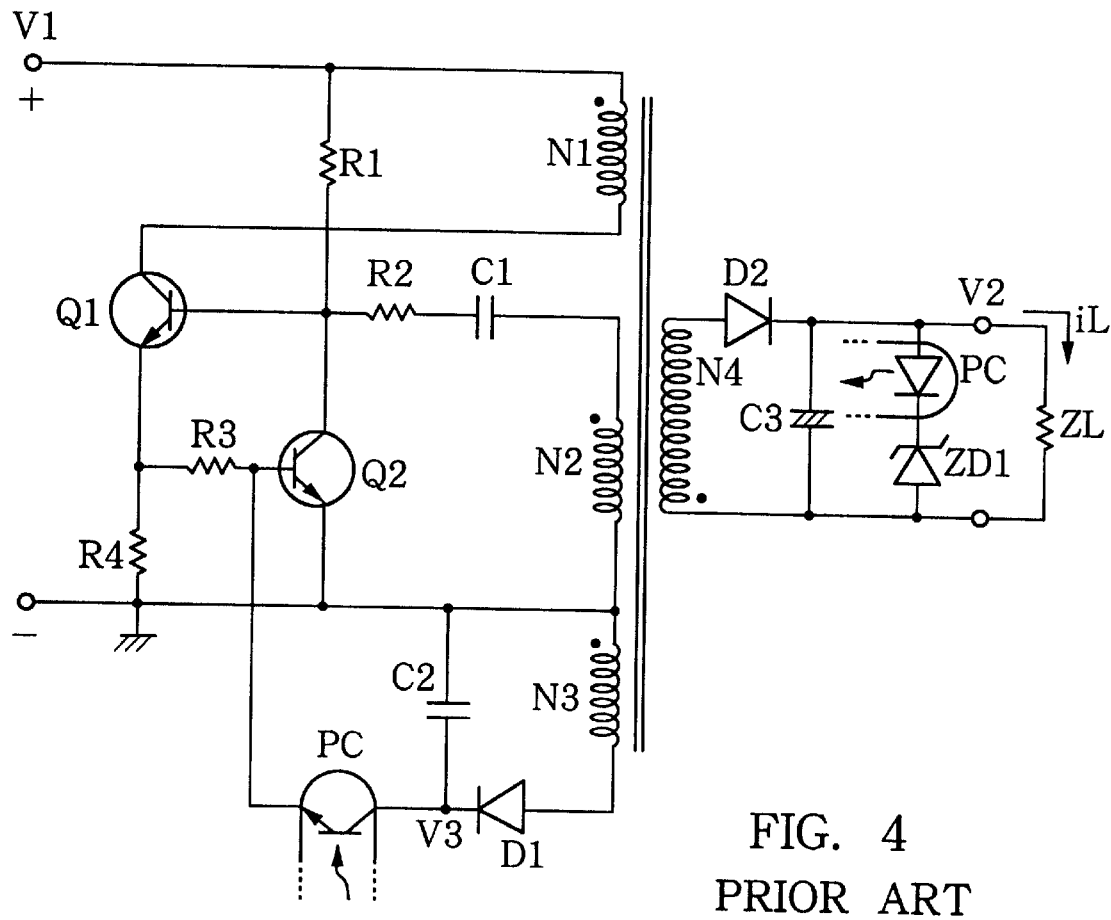
FIG. 4 is a circuit diagram showing a prior art switching power supply circuit.
Figure 5:
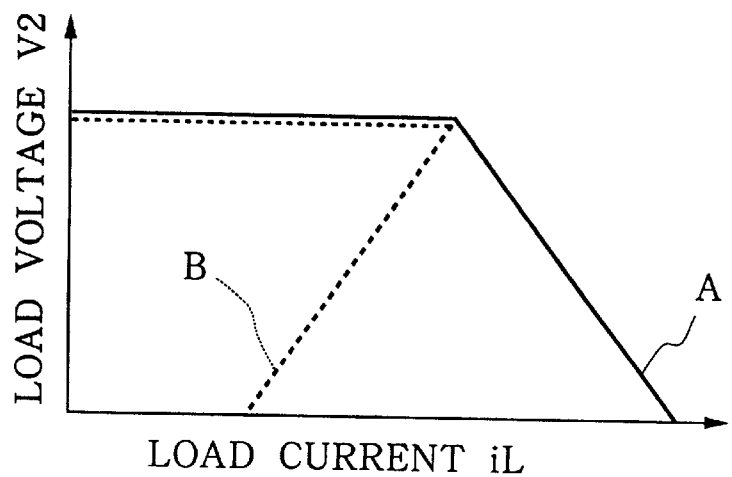
FIG. 5 is a diagram showing a load voltage-load current characteristic of the prior art switching power supply circuit.

The load current available during the intermittent oscillation state shown expressed on a time base is a pulse current of a certain period as shown in FIG. 3. The oscillation stop period is determined by a time constant which is determined by elements including the capacitors C4 and C5 and resistances R5 and R6. By determining this oscillation stop period at a large value, an average short-circuited current value becomes a very small one.

What is claimed is:

1. A switching power supply circuit comprising:

a dc voltage source;

a transformer having a primary winding and a secondary winding and is connected in the primary winding to the dc voltage source;

switching means provided between the dc voltage source and the transformer;

a secondary side circuit provided on the secondary winding side of the transformer and comprising a rectifying smoothing circuit;

switching control means for controlling turning on and off of the switching means by detecting output voltage and current of the secondary side circuit;

first rectified output generation means for rectifying and outputting a forward mode output comprising a first auxiliary winding wound on the transformer and a rectifying circuit;

second rectified output generation means for rectifying and outputting a back-boost mode output comprising a second auxiliary winding wound on the transformer and a rectifying circuit;

a threshold value circuit which judges presence of an overload state when an output of the second rectified output generation circuit is below a predetermined threshold value;

oscillation control means for supplying a control stop output to the switching control means when presence of an overload state has been judged by the threshold value circuit thereby to set the switching means to an intermittent oscillation mode; and a differentiating circuit for differentiating the output of the first rectified output generation means to detect a starting time and thereby interrupt the control stop output of the oscillation control means.

* * * * *